United States Patent [19]

Huang et al.

[11] 3,969,996
[45] July 20, 1976

[54] APPARATUS FOR LIQUID SMOKE REGENERATION

[75] Inventors: Min-Nan Huang, Madison; Neil F. Walter, Lodi, both of Wis.

[73] Assignee: DEC International, Inc., Madison, Wis.

[22] Filed: Apr. 10, 1975

[21] Appl. No.: 566,766

[52] U.S. Cl. ................................. 99/476; 99/482; 126/59.5; 426/314
[51] Int. Cl.² ........................................ A23B 4/04
[58] Field of Search .............. 99/467, 293–294, 99/340, 352–353, 359, 361, 403, 426, 470–471, 473–474, 475–476, 481–482, 487; 126/59.5; 426/235, 263, 302, 312, 314–315, 321, 331–332, 442

[56] References Cited
UNITED STATES PATENTS

| | | |
|---|---|---|
| 2,790,380 | 4/1957 | Shryack ........................... 99/476 X |
| 2,923,629 | 2/1960 | Bonomi .............................. 426/312 |
| 3,152,914 | 10/1964 | Taylor ............................... 99/476 X |
| 3,345,181 | 10/1967 | Smith, Jr. ............................. 426/314 |
| 3,408,205 | 10/1968 | Olson et al. ....................... 426/442 X |
| 3,565,051 | 2/1971 | Swift .................................. 99/476 X |
| 3,861,292 | 1/1975 | Gilliland et al. ...................... 99/476 |
| 3,871,353 | 3/1975 | Haug ............................... 99/482 X |

Primary Examiner—Billy J. Wilhite
Assistant Examiner—Arthur O. Henderson
Attorney, Agent, or Firm—Darbo, Robertson & Vandenburgh

[57] ABSTRACT

Air heated to between 500° and 800° F. is blown into a smoke generation chamber and simultaneously liquid smoke is sprayed into the chamber. The heated air vaporizes the liquid smoke and the smoke vapor is conducted into a smokehouse where food is being processed.

8 Claims, 1 Drawing Figure

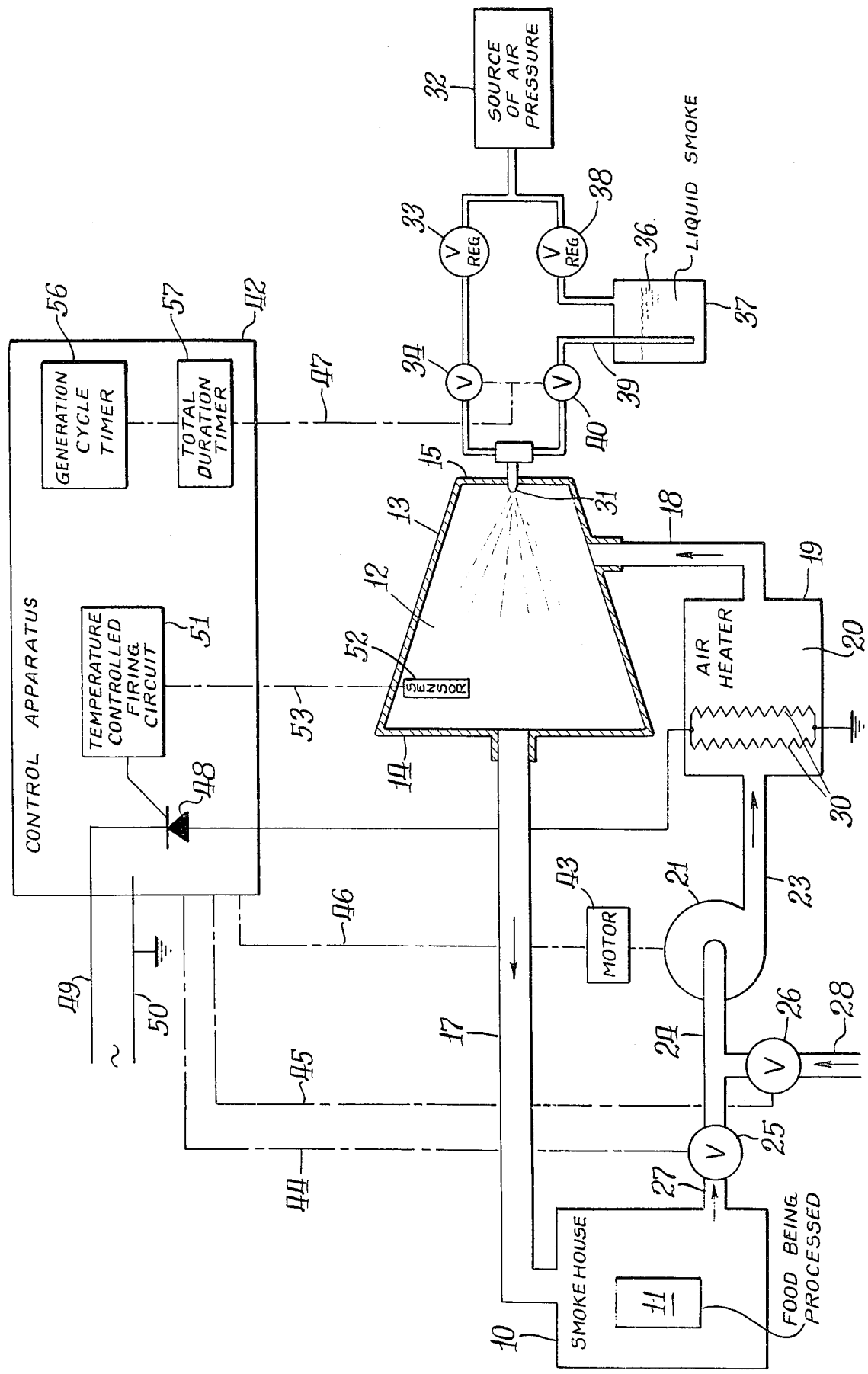

APPARATUS FOR LIQUID SMOKE REGENERATION

BACKGROUND AND SUMMARY OF THE INVENTION

Historically, smoke for use in food processing operations was produced by heating wood to a charring temperature. The use of liquid smoke has to a substantial extent replaced the traditional procedure in a food processor's plant. Liquid smoke can be directly incorporated into a food product or applied to the surface of the food product by means of a spray or bath. A third procedure is to employ heat to vaporize the liquid smoke, with the smoke vapor then being utilized in the smokehouse where the food is being processed to impart the smoky flavor, etc., to the food. Examples of this third procedure are found in Canadian Pat. No. 603,487 and U.S. Pat. No. 3,861,292. The present invention relates to this third procedure.

The prior art practices for vaporizing liquid smoke to produce a smoke vapor to be employed in a smokehouse involve applying the liquid smoke to electric heaters or other heated surfaces which would raise the temperature of the liquid smoke above its boiling point and thereby cause it to vaporize. This has two primary disadvantages, namely, (1) as the liquid smoke vaporizes some of it leaves a residue on the heated surface, which residue can become significant over a period of time and (2) there is a danger of fire, particularly after significant residue build-up on the heated element. The principal object of the present invention is to eliminate these disadvantages. This is done by having the element that supplies the heat externally of the chamber in which the liquid smoke is vaporized, thereby preventing any direct contact between the heated element and the liquid smoke. The heating element is employed to heat air to a temperature of between about 500°F. and about 800°F. This heated air then is used in the vaporizing chamber to heat the liquid smoke to a temperature in excess of its boiling point and thereby vaporize the liquid smoke.

A further feature of the present invention is the ability to control, with a comparatively high degree of accuracy, the amount of smoke vapor generated and introduced into the smokehouse. Comparatively, the prior art procedures were somewhat hit or miss so far as the amount of smoke vapor produced was concerned. Thus, it was possible that the various batches of food being processed in the smokehouse would not be subjected to uniform conditions so far as smoke vapor was concerned.

Another aspect of the present invention resides in the cycling of liquid smoke generation in a manner such that during the overall smoking operation, there are a series of intervals during which smoke is actually generated, which smoke generation intervals are separated by intervals during which no smoke generation occurs. This pulsing of the smoke generation has proven quite effective, both from a standpoint of effectively processing the food product and also from the standpoint of economy.

Further objects and advantages will become apparent from the following description.

DESCRIPTION OF THE DRAWING

The drawing diagrammatically illustrates an embodiment of the invention used in conjunction with a smokehouse.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The present invention is employed to produce a smoke vapor used in a smokehouse 10 in which food 11 is being processed. The smoke vapor generator comprises a housing which defines a generation chamber 12. This housing is made up of a truncated conical wall 13 and two end walls 14 and 15. A duct 17 extends from end wall 14 to smokehouse 10. A duct 18 extends from wall 13 to an enclosure 19 which defines an air heating chamber 20. The discharge side of a blower 21 is connected to enclosure 19 by a duct 23. Connected to the intake of blower 21 is a duct 24 which is also connected to motorized valves or dampers 25 and 26. A duct 27 connects valve 25 to smokehouse 10. The duct 28 of valve 26 communicates with ambient air.

Within the air heating chamber 20 are electrical resistance heating elements 30. A nozzle 31 positioned axially in wall 15 of the smoke generation housing is used to spray liquid smoke into chamber 12. This nozzle is supplied with atomizing air from an air source 32 through a pressure regulating valve 33 and a motorized control valve 34. The liquid smoke 36 is held in a closed tank or container 37. This container is pressurized from air source 32 through a pressure regulating valve 38. The liquid smoke draw pipe 39 extends from the lower part of container 37 to nozzle 31 and has a motorized control valve 40 therein. Thus when valves 34 and 40 are open, liquid smoke is sprayed from nozzle 31.

The control apparatus 42 is, in the illustrated embodiment, used to operate valves 25 and 26, motor 43 of blower 21 and valves 34 and 40 as indicated by dot-dash lines 44–47, respectively. It also modulates the supply of electricity to heaters 30 in accordance with the temperature requirements of the air in chamber 12 to maintain a predetermined temperature (within set limits) of the air in that chamber. To this end, a silicon control rectifier (SCR) is employed in the electrical circuit between the electric source of power (as represented by conductors 49 and 50 and the resistance heaters 30. The gate of the SCR is connected to a temperature controlled firing circuit 51. A temperature sensor 52 located in chamber 12 advises the firing circuit 51 of the chamber temperature as indicated by dot-dash line 53. When additional heat is required in chamber 12, the SCR 48 is turned on for a greater portion of the cycle of the AC current so that additional electrical energy is provided to heaters 20. Conversely, the firing circuit 51 shortens the part of the cycle during which the SCR permits electric current to flow to the heaters when less heat is required in chamber 12. Obviously, the diagrammatic illustration of the SCR connection is greatly simplified, but temperature control circuits of the general type illustrated are well known in the electronic art. Just by way of an illustration, see page 278 of SCR Manual, Fourth Edition, published by General Electric Company in 1967. Also, one would undoubtedly use a Triac (General Electric's trade name for a gate-controlled full-wave AC silicon switch) as the SCR to achieve full-wave operation.

The generation cycle timer 56 determines, within the overall smoke generation period, the length of the intervals during which liquid smoke is actually sprayed and the length of the rest intervals therebetween. Thus, it would be a pulse timer which, during the overall smoke generation period, would be "on" for an interval and then "off" for an interval. During the "on" periods the valves 34 and 40 would be open. During the "off" intervals the valves would be closed. The "on" and "off" intervals would have a duration of perhaps two to three minutes each. The total duration timer 57 determines the total duration of smoke generation and would comprise a counter to count a predetermined number of "on" (or "off") intervals produced by pulse timer 56. When a given number of intervals had occurred, timer 57 would terminate the overall smoke generation period.

At the start of a smoke generation period, motor 43 and heaters 30 would be initially energized to preheat the chamber 12 to operating temperature. Depending upon the desires of the operator, valves 25 or 26 would be open so that blower 21 would draw air from the smokehouse or from outside. When a predetermined temperature had been reached, as determined by sensor 52 (or determined on a time basis), the interval timer 56 opens valves 34 and 40 to spray liquid smoke 36 into chamber 12. The heat of the air in that chamber vaporizes the sprayed liquid smoke. The smoke vapor is then conducted (the action of blower 21) through duct 17 into smokehouse 10. Thereafter would follow a series of "on" and "off" intervals during which, respectively, the liquid smoke would be sprayed and not sprayed. At the conclusion of a predetermined number of such intervals, timer 57 would shut down the smoke generation operation.

In a specific embodiment the end 14 of the smoke generator housing was eighteen inches (0.457 m.) in diameter and the end 15 was ten inches (0.254 m.) in diameter. The distance between the two ends was three feet (0.915 m.). The volume of hot air passing through the chamber 12 must be sufficient to vaporize all of the liquid smoke emitted by nozzle 31. This prevents any precipitation of the liquid smoke on the housing walls where it would decompose and form a residue. Thus, the quantities of liquid smoke sprayed through nozzle 31 and the volume of air flow (as well as the temperature of the air in chamber 12) will be correlated by the user to achieve optimum and adequate smoke generation with a minimum use of energy. While the air temperature range in chamber 12 should be between about 500°F. (260°C.) and about 800°F. (427°C.), 650°F. (343°C.) has proven to be a suitable temperature for use. We prefer to use an electric air heater because of the ability to accurately modulate the temperature and because no flame is present, but other forms of heaters could be employed, such as a catalytic gas heater.

Although the illustrated embodiment employs a duct 17 to conduct the smoke vapor directly to the smokehouse, it will be apparent to those skilled in the art that the smoke generator may be used in more sophisticated systems in which other components, such as a humidifier, etc., are employed in connection with the conditioning of the air in the smokehouse. Thus, for example, the smoke generator of the present invention could be used in place of the smoke generator of U.S. Application Ser. No. 561,232 (the disclosure of which is incorporated herein by reference), assigned to the same assignee as the present application, which represents a more sophisticated system for conditioning the air in a smokehouse.

We claim:

1. In the combination of a food smokehouse, a smoke generator having a vaporizing chamber and a nozzle through which liquid smoke is introduced into the chamber to produce smoke vapor therein, and duct means connecting the chamber and the smokehouse for conducting the smoke vapor to the smokehouse, the improvement comprising:
   air heater means externally of said chamber, means defining an air passage between the air heater means and the chamber, and means for producing a flow of heated air from the air heater means into said chamber, said air heater means producing an air temperature of at least 500°F. in said chamber for vaporizing the liquid smoke from said nozzle.

2. In the combination set forth in claim 1, the further improvement
   wherein said air heater means comprises an electric heating element, and
   including electric supply control means connected to said element for modulating the supply of electricity to said element.

3. In the combination set forth in claim 2, wherein said control means includes a sensor positioned to determine the air temperature in said chamber, said control means modulating the supply of electricity to maintain the air temperature in the chamber within a predetermined range.

4. In the combination set forth in claim 3, including valve means connected to said nozzle for controlling the flow of liquid smoke to said nozzle, and control means connected to said valve means for determining the duration of the overall period within which smoke is generated and for opening and closing said valve means a plurality of times within said overall period whereby within the overall period smoke is generated for a plurality of intervals separated by intervals within which no smoke generation takes place.

5. In the combination set forth in claim 1, including valve means connected to said nozzle for controlling the flow of liquid smoke to said nozzle, and control means connected to said valve means for determining the duration of the overall period within which smoke is generated and for opening and closing said valve means a plurality of times within said overall period whereby within the overall period smoke is generated for a plurality of intervals separated by intervals within which no smoke generation takes place.

6. In the combination set forth in claim 5, wherein said control means includes a timer for determining the length of the intervals during which the valve is open for the generation of smoke and the length of the intervals during which the valve is closed, and counter means connected to said timer for determining the overall period by counting said intervals.

7. In the combination set forth in claim 1, wherein said smoke generator has a plurality of walls defining said chamber, two of said walls being opposite each other, one of the two walls being relatively small in area as compared to the other of the walls, said nozzle being positioned at said one wall to direct said spray in the direction of the other of the two walls.

8. In the combination set forth in claim 7, wherein said duct means communicates with said chamber through said other wall, and said walls include a frusto-conical wall connecting said two walls.

* * * * *